J. BUTLER.
CLOTHES LINE HOLDER.
APPLICATION FILED JUNE 16, 1915.

1,192,985.

Patented Aug. 1, 1916.

WITNESSES
W. J. Rodgers.
W. F. Keefer.

INVENTOR
John Butler
By
ATTORNEYS

UNITED STATES PATENT OFFICE.

JOHN BUTLER, OF STEUBENVILLE, OHIO, ASSIGNOR OF ONE-HALF TO FRANK A. BUTTE, OF STEUBENVILLE, OHIO.

CLOTHES-LINE HOLDER.

1,192,985. Specification of Letters Patent. Patented Aug. 1, 1916.

Application filed June 16, 1915. Serial No. 34,330.

*To all whom it may concern:*

Be it known that I, JOHN BUTLER, a citizen of the United States of America, and resident of Steubenville, county of Jefferson, and State of Ohio, have invented certain new and useful Improvements in Clothes-Line Holders, of which the following is a specification.

This invention relates broadly to line holders, and specifically to holders for clothes lines and the like.

The primary object of the invention is to provide a simple, durable and inexpensive device designed for mounting upon a post, wall, or the like, and adapted to facilitate the stretching of a clothes line and also to securely hold such line in its stretched condition.

With this and other objects in view, the invention resides in the features of construction, arrangement of parts and combinations of elements which will hereinafter be fully described, reference being had to the accompanying drawings, forming a part of this specification, in which—

Figure 1:
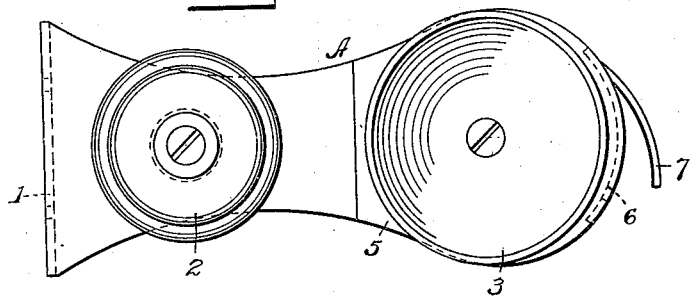
Figure 2:
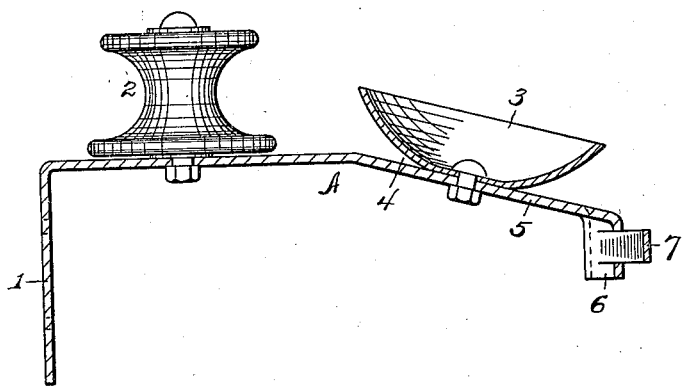

Figure 1 is a top plan view of the invention; and Fig. 2 is a longitudinal section of the same.

Referring to said drawings, A indicates generally a metal plate adapted to be mounted upon a post, wall, or the like, to occupy a substantially horizontal position, having an angularly disposed end 1 designed for attachment to such post or wall. Mounted on said plate adjacent to said end 1 is a pulley 2 about which a line may be passed for facilitating the stretching of the line. Fixed upon said plate in front of said pulley is a cup-like metal disk 3 between the walls of which and said plate is afforded an annular tapered space or channel 4 designed for having the line wedged therein after the same has been drawn up tight about the pulley, said line being looped around said disk and tightly drawn into said channel, whence it is carried on to the next post or point of attachment, and so on to the end. The portion of the plate upon which the disk 3 is mounted is preferably inclined downward slightly, as shown at 5, to facilitate the drawing of the line into the channel 4 after being looped about the disk.

A downwardly directed lip 6 is preferably provided at the front end of the plate, and struck up from the metal of said lip is a resilient tongue 7 between which and the lip proper the free end of the line may be drawn for preventing chance disengagement of the same, as at the last post in a series.

What is claimed is:—

1. A line holder comprising a plate having a portion designed for attachment to a post or other support, a cup-like disk mounted on said plate and providing an annular tapered line-wedging space thereabout, and a pulley whereon the line may be drawn taut prior to insertion in said space, said pulley being mounted on said plate intermediate said disk and the support.

2. A line holder comprising a plate having an angularly disposed portion designed for attachment to a post or other support, a cup-like disk mounted on said plate to form an annular tapered space about which a line may be wedgingly received, a pulley mounted on said plate intermediate said disk and the support, a lip formed at the front end of said plate, and a resilient tongue struck up from said lip and adapted to receive a line therebehind.

In testimony whereof, I affix my signature in presence of two subscribing witnesses.

JOHN BUTLER.

Witnesses:
 HARRY B. GALBRAITH,
 FRED A. STONE.

Copies of this patent may be obtained for five cents each, by addressing the "Commissioner of Patents, Washington, D. C."